US012267640B2

(12) United States Patent
Chen et al.

(10) Patent No.: US 12,267,640 B2
(45) Date of Patent: Apr. 1, 2025

(54) EARPHONE

(71) Applicant: VIVO MOBILE COMMUNICATION CO., LTD., Dongguan (CN)

(72) Inventors: Junhui Chen, Dongguan (CN); Ningjie Zheng, Dongguan (CN); Wei Li, Dongguan (CN); Lele Li, Dongguan (CN)

(73) Assignee: VIVO MOBILE COMMUNICATION CO., LTD., Dongguan (CN)

(*) Notice: Subject to any disclaimer, the term of this patent is extended or adjusted under 35 U.S.C. 154(b) by 227 days.

(21) Appl. No.: 18/058,544

(22) Filed: Nov. 23, 2022

(65) Prior Publication Data

US 2023/0092790 A1 Mar. 23, 2023

Related U.S. Application Data

(63) Continuation of application No. PCT/CN2021/094509, filed on May 19, 2021.

(30) Foreign Application Priority Data

May 26, 2020 (CN) ......................... 202010453201.2

(51) Int. Cl.
*H04R 1/10* (2006.01)

(52) U.S. Cl.
CPC ......... *H04R 1/1058* (2013.01); *H04R 1/1016* (2013.01)

(58) Field of Classification Search
None
See application file for complete search history.

(56) References Cited

U.S. PATENT DOCUMENTS 8,111,863 B2 * 2/2012 Oliveira ............... H04R 1/1058 381/328
8,611,578 B2 * 12/2013 Kim ...................... H02J 7/0044 381/328

(Continued)

FOREIGN PATENT DOCUMENTS

CN 201153320 Y 11/2008
CN 102026082 A 4/2011

(Continued)

OTHER PUBLICATIONS

English language translation of CN107708015, pp. 1-5. (Year: 2018).*

(Continued)

*Primary Examiner* — Paul W Huber
(74) *Attorney, Agent, or Firm* — The Webb Law Firm

(57) ABSTRACT

An earphone includes a loudspeaker, a rear housing and a front housing. The loudspeaker is disposed in the rear housing, a sound output hole is disposed at a first end of the front housing, a second end of the front housing is rotatably connected to the rear housing, and the front housing is rotatable relative to the rear housing and between a first position and a second position. In a case that the front housing is rotated to the first position relative to the rear housing, the sound output hole faces a first direction, and the loudspeaker is configured to output a first channel audio signal. In a case that the front housing is rotated to the second position relative to the rear housing, the sound output hole faces a second direction, and the loudspeaker is configured to output a second channel audio signal.

11 Claims, 6 Drawing Sheets

(56) References Cited

U.S. PATENT DOCUMENTS

| | | | | |
|---|---|---|---|---|
| 8,831,240 | B2 * | 9/2014 | Zhong | H04M 1/6066 381/384 |
| 8,838,030 | B2 * | 9/2014 | Liao | H04R 1/1091 455/41.2 |
| 8,879,722 | B1 | 11/2014 | Wang et al. | |
| 9,402,125 | B2 * | 7/2016 | Davie | H04R 1/105 |
| 9,532,126 | B1 * | 12/2016 | Kelly | H04R 1/105 |
| 9,883,278 | B1 | 1/2018 | Lin et al. | |
| 10,231,045 | B2 * | 3/2019 | Lee | H04R 1/1041 |
| 2004/0042629 | A1 * | 3/2004 | Mellone | H04R 1/1058 381/74 |
| 2004/0055811 | A1 * | 3/2004 | Shih | H04R 1/105 181/129 |
| 2010/0027824 | A1 | 2/2010 | Atamaniuk et al. | |
| 2012/0195455 | A1 | 8/2012 | Chiba et al. | |
| 2013/0279724 | A1 | 10/2013 | Stafford et al. | |
| 2019/0132666 | A1 | 5/2019 | Mou | |

FOREIGN PATENT DOCUMENTS

| | | | |
|---|---|---|---|
| CN | 102550045 | A | 7/2012 |
| CN | 203289619 | U | 11/2013 |
| CN | 104202697 | A | 12/2014 |
| CN | 204114148 | U | 1/2015 |
| CN | 104754440 | A | 7/2015 |
| CN | 105101016 | A | 11/2015 |
| CN | 205580842 | U | 9/2016 |
| CN | 205793197 | U | 12/2016 |
| CN | 106686482 | A | 5/2017 |
| CN | 206251301 | U | 6/2017 |
| CN | 206299351 | U | 7/2017 |
| CN | 206851001 | U | 1/2018 |
| CN | 107708015 | A | 2/2018 |
| CN | 107801113 | A | 3/2018 |
| CN | 108737917 | A | 11/2018 |
| CN | 208143449 | U | 11/2018 |
| CN | 111629296 | A | 9/2020 |
| JP | 2004274540 | A | 9/2004 |
| JP | 2015133673 | A | 7/2015 |

OTHER PUBLICATIONS

English language translation of CN205793197, pp. 1-3. (Year: 2016).*

* cited by examiner

EARPHONE

CROSS-REFERENCE TO RELATED APPLICATIONS

This application is a Bypass Continuation application of International Application No. PCT/CN2021/094509 filed May 19, 2021, and claims priority to Chinese Patent Application No. 202010453201.2 filed May 26, 2020, the disclosures of which are hereby incorporated by reference in their entirety.

BACKGROUND OF THE INVENTION

Field of the Invention

The present disclosure relates to the technical field of electronic products, and in particular to an earphone.

Description of Related Art

With the rapid development of the electronics industry, a variety of mobile phones emerge in an endless stream, so do a variety of earphones. For now, the popular types of earphones are those divided as left and right earphones for wearing. For example, true wireless stereo (TWS) Bluetooth earphones need to be divided as left and right earphones, where the "L" marked earphone is only used to be worn on the left ear, and the "R" marked earphone is only used to be worn on the right ear.

SUMMARY OF THE INVENTION

The embodiments of the present disclosure provide an earphone. The earphone includes a loudspeaker, a rear housing and a front housing, where the loudspeaker is disposed in the rear housing, a sound output hole is disposed at a first end of the front housing, a second end of the front housing is rotatably connected to the rear housing, and the front housing is rotatable relative to the rear housing and between a first position and a second position;

in a case that the front housing is rotated to the first position relative to the rear housing, the sound output hole faces a first direction, and the loudspeaker is configured to output a first channel audio signal; and in a case that the front housing is rotated to the second position relative to the rear housing, the sound output hole faces a second direction, and the loudspeaker is configured to output a second channel audio signal;

where the first direction and the second direction are different directions.

BRIEF DESCRIPTION OF THE DRAWINGS

To explain the technical solution in embodiments of the present disclosure more clearly, the accompanying drawings required for describing the embodiments of the present disclosure are briefly introduced below. Apparently, the accompanying drawings in the following description show merely some embodiments of the present disclosure, and a person skilled in the art can still derive other accompanying drawings from these accompanying drawings.

DESCRIPTION OF THE INVENTION

Figure 1:
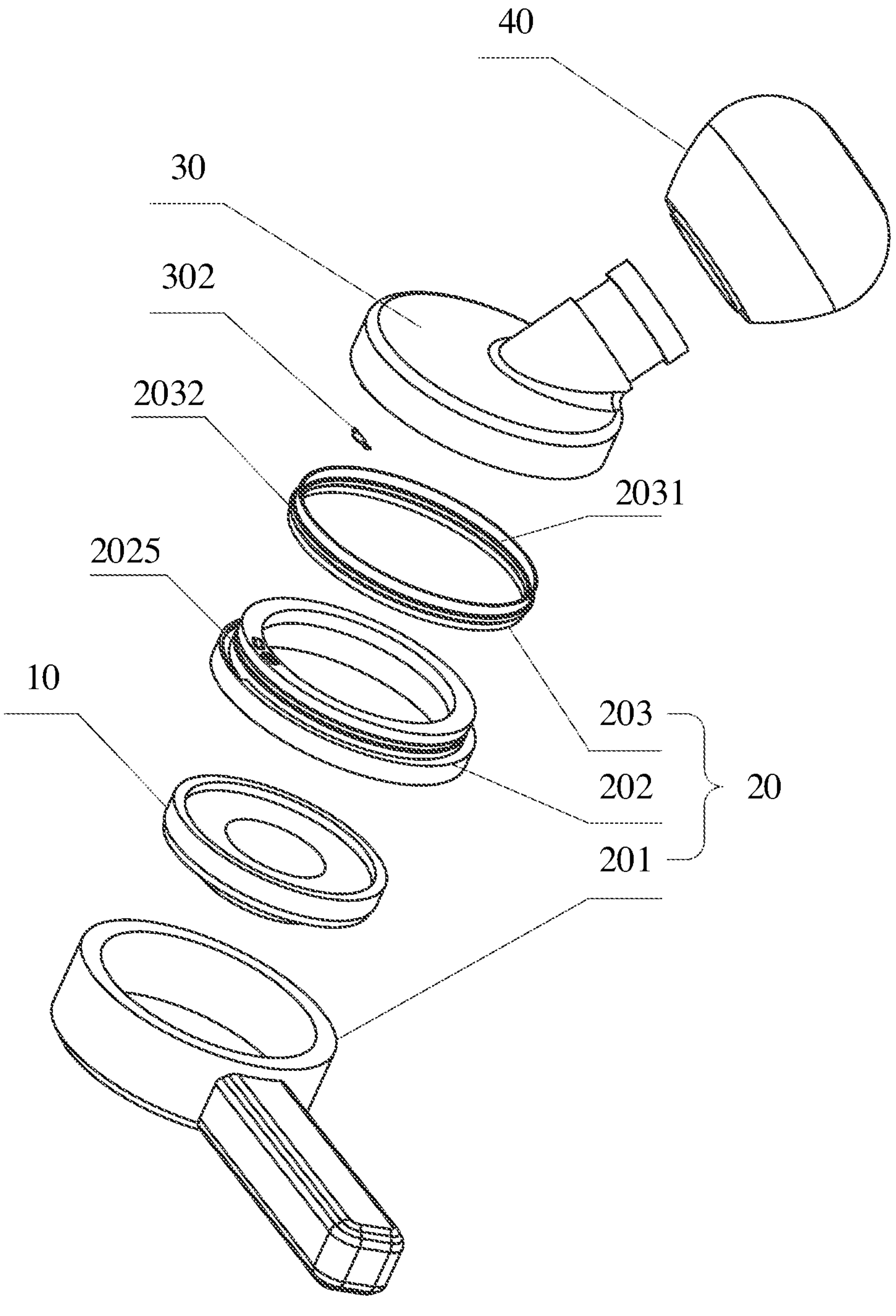
FIG. 1 is a schematic exploded structural diagram of an earphone provided in an embodiment of the present disclosure.

The technical solution in embodiments of the present disclosure are clearly described below with reference to the accompanying drawings in the embodiments of the present disclosure. Apparently, the described embodiments are not all the embodiments, but merely some of the embodiments of the present disclosure. Based on the embodiments of the present disclosure, all other embodiments obtained by a person skilled in the art shall fall within the scope of protection of the present disclosure.

Unless otherwise defined, technical or scientific terms used in the present disclosure are to have ordinary meanings as understood by persons having general skills in the field to which the present disclosure belongs. "First", "second" and other similar terms used in the present disclosure do not denote any order, quantity, or importance, but are merely used to distinguish different components. Similarly, "a", "an" and other similar terms do not denote any quantitative limitation, but denote the number of at least one. "Connecting", "connected" and other similar terms are not limited to physical or mechanical connection, but may include electrical connection, whether direct or indirect. "Up", "down", "left", "right", etc. are only used to denote relative positional relationship, and when the absolute position of the object described changes, the relative positional relationship also changes, accordingly.

Usually, due to the difference in structural design, in a case that the "L" marked earphone is worn on the right ear, or the "R" marked earphone is worn on the left ear, a user may feel uncomfortable, for example, there may be a situation where the earphone cannot be worn or the playback effect is poor. Therefore, the use flexibility of earphones is poor.

Referring to FIG. 1 to FIG. 7, the embodiments of the present disclosure provide an earphone. The earphone includes a loudspeaker 10, a rear housing 20 and a front housing 30, where the loudspeaker 10 is disposed in the rear housing 20, a sound output hole 301 is disposed at a first end of the front housing 30, a second end of the front housing 30 is rotatably connected to the rear housing 20, and the front housing 30 is rotatable relative to the rear housing 20 and between a first position and a second position;

in a case that the front housing 30 is rotated to the first position relative to the rear housing 20, the sound output hole 301 faces a first direction, and the loudspeaker 10 is configured to output a first channel audio signal; and in a case that the front housing 30 is rotated to the second position relative to the rear housing 20, the sound output hole faces a second direction, and the loudspeaker 10 is configured to output a second channel audio signal.

The first direction and the second direction are different directions.

In the embodiments of the present disclosure, both the rear housing 20 and the front housing 30 may be made of a plastic material; the sound output hole is to be understood as a sound output channel, having one end communicated with the outside and the other end disposed corresponding to the loudspeaker 10; and sound produced by the loudspeaker 10 can enter the outside through the sound output hole 301. Generally, when using the earphone, a portion of the front housing 30 is at least located in the ear canal, and an opening of the sound output hole 301 communicated with the outside is formed on the portion of the front housing 30 located in the ear canal, such that the sound produced by the loudspeaker 10 can pass through the sound output hole 301 and enter the ear canal.

Figure 4:
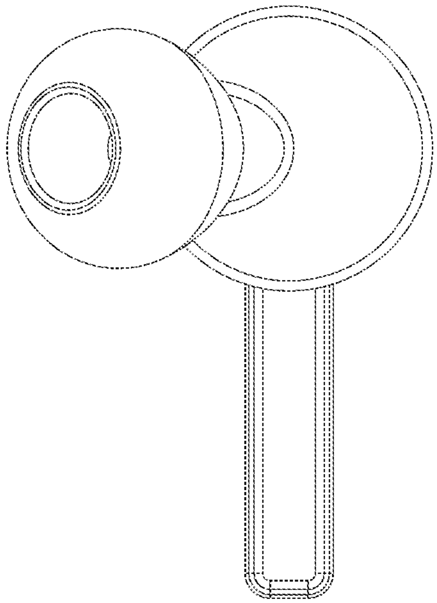
FIG. 4 is a schematic structural diagram of a state of the earphone provided in an embodiment of the present disclosure.
Figure 5:
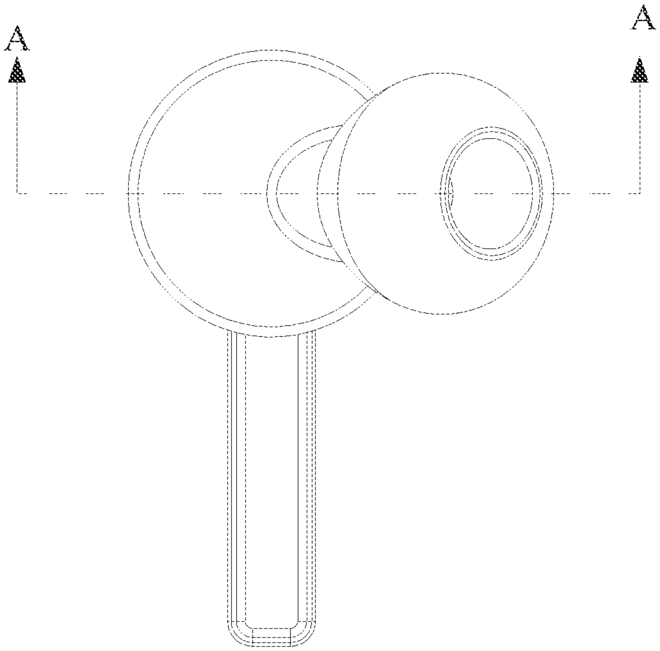
FIG. 5 is a schematic structural diagram of another state of the earphone provided in an embodiment of the present disclosure.
Figure 6:
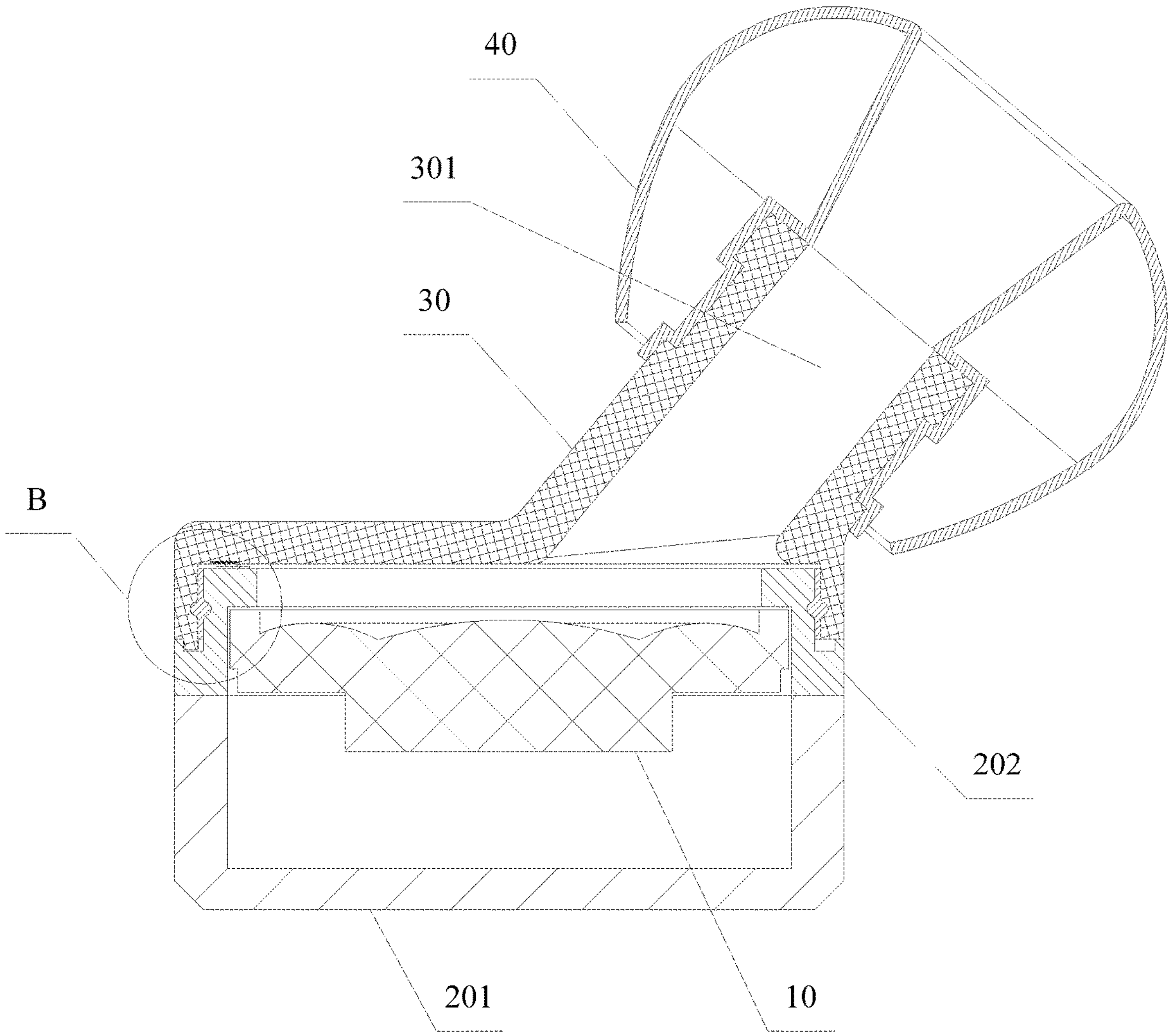
FIG. 6 is a schematic sectional structural diagram along direction A-A in FIG. 5.
Figure 7:
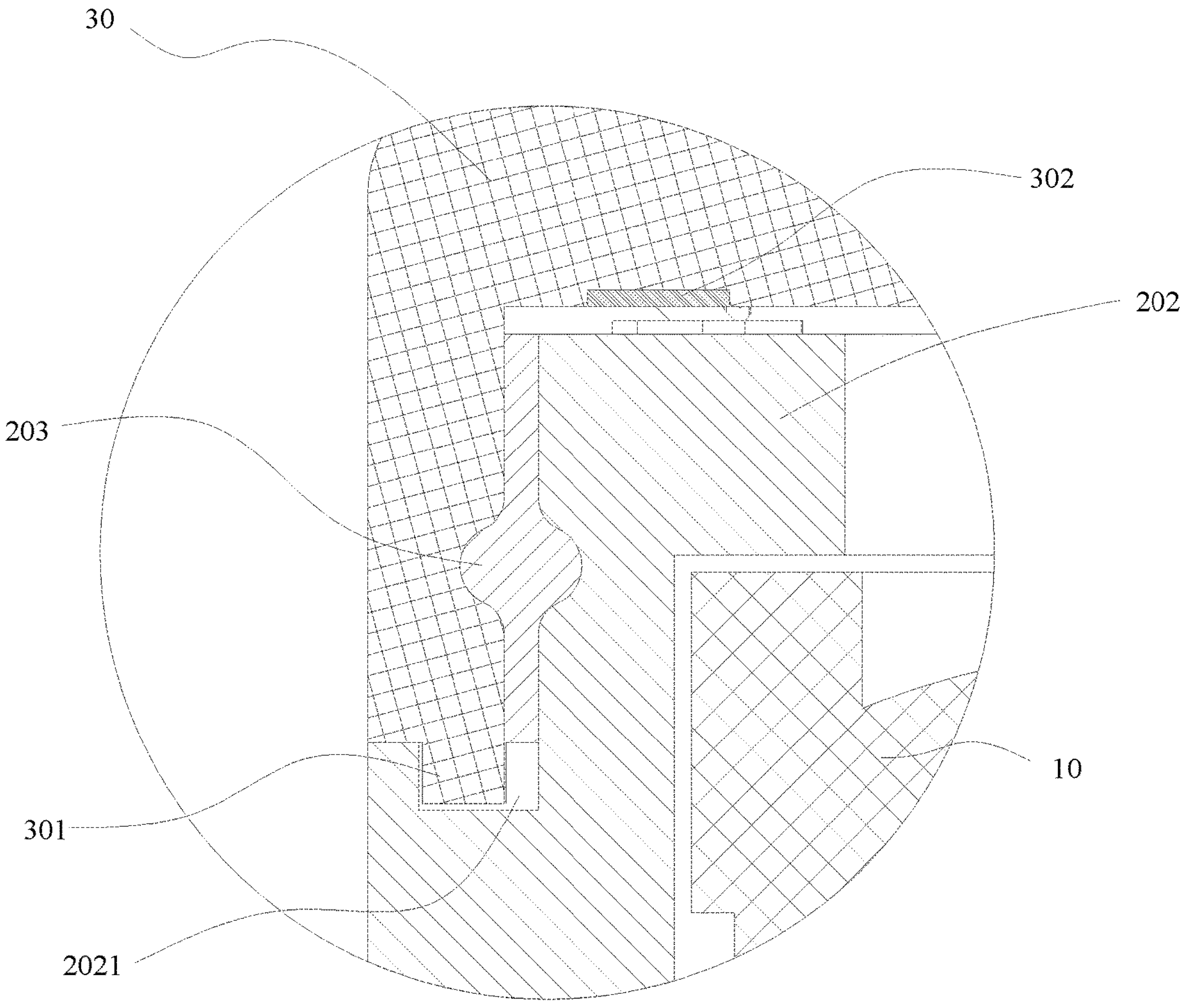
FIG. 7 is a partially enlarged schematic structural diagram at position B in FIG. 6.

The first channel audio signal and the second channel audio signal are different channel audio signals. For example, in a case that the first channel audio signal is a right channel audio signal, the second channel audio signal is a left channel audio signal; or, in a case that the first channel audio signal is a left channel audio signal, the second channel audio signal is a right channel audio signal. In one embodiment, in a case that the front housing 30 is rotated to the first position relative to the rear housing 20, the sound output hole 301 faces the first direction, which is shown in FIG. 4. In this case, the earphone forms a right earphone, that is, the earphone is used as the right earphone. In another embodiment, in a case that the front housing 30 is rotated to the second position relative to the rear housing 20, the sound output hole 301 faces the second direction, which is shown in FIG. 5. In this case, the earphone forms a left earphone, that is, the earphone is used as the left earphone.

Optionally, when using the earphone, depending on actual needs, the front housing 30 can be rotated to the first position or the second position relative to the rear housing 20, so as to be inserted into the corresponding ear of a user. For example, in a case that the user wants to use the right ear to listen to the sound, the front housing 30 can be rotated to the first position relative to the rear housing 20, which is shown in FIG. 4. In a case that the user wants to use the left ear to listen to the sound, the front housing 30 can be rotated to the second position relative to the rear housing 20, which is shown in FIG. 5.

In the embodiments of the present disclosure, it is configured that an earphone includes a loudspeaker 10, a rear housing 20 and a front housing 30, where the loudspeaker 10 is disposed in the rear housing 20, a sound output hole 301 is disposed at a first end of the front housing 30, a second end of the front housing 30 is rotatably connected to the rear housing 20, and the front housing 30 is rotatable relative to the rear housing 20 and between a first position and a second position; in a case that the front housing 30 is rotated to the first position relative to the rear housing 20, the sound output hole 301 faces a first direction, and the loudspeaker 10 is configured to output a first channel audio signal; and in a case that the front housing 30 is rotated to the second position relative to the rear housing 20, the sound output hole faces a second direction, and the loudspeaker 10 is configured to output a second channel audio signal. The first direction and the second direction are different directions. In this case, the front housing 30 can be rotated to different positions to adapt to different ears, thereby improving the use flexibility of the earphone.

The earphone may be a wired earphone, or may be a wireless earphone. In a case that the earphone is the wireless earphone, each earphone is a relatively independent earphone, and there is no need to distinguish left and right earphones. Therefore, the earphone can be sold separately. For example, if a user loses one earphone, the user only needs to buy one. In addition, since the structures of the left and right earphones are completely the same in this embodiment, mold opening production and preparation of the left and right earphones are completely the same, such that the production and preparation of the earphones are more convenient and the production cost is lower.

It is to be understood that in one embodiment, the earphone can further include an ear cap 40, the ear cap 40 is sleeved on the front housing 30, and the ear cap may be a silicone cap. The provision of the ear cap improves the comfort of wearing the earphone.

Optionally, the rear housing 20 includes a base 201 and a fixing member 202, the base 201 is connected to the fixing member 202, the base 201 is provided with a first cavity, the fixing member 202 is provided with a second cavity, the first cavity and the second cavity are communicated with each other to form an accommodating cavity, and the loudspeaker 10 is disposed in the accommodating cavity; and the front housing 30 is rotatably connected to the fixing member 202, and the sound output hole 301 is communicated with the second cavity.

In this embodiment, the fixing member 202 may be of an annular structure, and the sound output hole 301 is communicated with the second cavity through an opening of an inner ring of the fixing member 202, such that the sound produced by the loudspeaker 10 in the accommodating cavity can enter the sound output hole 301.

Optionally, a circular opening 304 is disposed at an end of the front housing 30 connected to the fixing member 202, a portion of the fixing member 202 may be located in the front housing 30, and an outer wall of the fixing member 202 and an inner wall of the front housing 30 cooperate with each other to achieve rotational connection. For example, in one embodiment, the rear housing 20 further includes a sealing member 203, a first annular protrusion 2031 is disposed on an inner wall of the sealing member 203, a second annular protrusion 2032 is disposed on an outer wall of the sealing member 203, a first annular groove 2025 fitting the first annular protrusion 2031 is disposed on an outer side wall of the fixing member 202, a second annular groove 304 fitting the second annular protrusion 2032 is disposed on an inner wall of the front housing 30, the sealing member 203 is sleeved on a portion of the outer side wall of the fixing member 202, and the front housing 30 is sleeved on a periphery of the sealing member 203; and the first annular protrusion 2031 is located in the first annular groove 2025, and the second annular protrusion 2032 is located in the second annular groove 304.

In this embodiment, the sealing member 203 may be an annular sealing sleeve, and may be made of a material such as silicone and rubber. For example, the sealing member 203 may be a silicone sleeve. The sealing member can be sleeved on the outer wall of the fixing member 202, and the front housing 30 is sleeved on the sealing member 203, so as to achieve connection between the front housing 30 and the fixing member 202. By configuring that the first annular protrusion 2031 is located in the first annular groove 2025, movement of the sealing member 203 in the axial direction (the central axis of the fixing member) relative to the fixing member 202 is limited; and by configuring that the second annular protrusion 2032 is located in the second annular groove 304, movement of the front housing 30 in the axial direction relative to the sealing member 203 is limited. Through the guide effect of the first annular groove 2025 on the first annular protrusion 2031 and/or the guide effect of the second annular groove 304 on the second annular protrusion 2032, under an action of an external force, the front housing 30 can be rotated along the axial direction relative to the fixing member 202.

It is to be understood that the front housing 30 being rotated axially relative to the fixing member 202 may satisfy at least one of:

the sealing member 203 is rotatable relative to the fixing member 202 in an axial direction; or the sealing member 203 is rotatable relative to the front housing 30 in the axial direction.

In other embodiments, rotation of the front housing 30 relative to the fixing member 202 can be achieved using other methods, for example, providing the annular groove on the fixing member 202 and providing the protrusion fitting the annular groove on the front housing 30, or, providing the annular groove in the front housing 30 and providing the protrusion fitting the annular groove on the fixing member 202.

Optionally, a quantity of annular protrusions is multiple, and a plurality of protrusions are evenly spaced on a same circumference. In this embodiment, since the annular protrusion is used, an outside object can be effectively prevented from entering the rear housing 20 through a gap between the front housing 30 and the fixing member 202, thereby improving the use safety of the earphone.

Optionally, a position-limiting groove 2021 is further disposed on the outer side wall of the fixing member 202, a position-limiting sliding block 302 is disposed on the front housing 30, a portion of the position-limiting sliding block 302 is at least located in the position-limiting groove 2021 and is in position-limiting fit to the position-limiting groove 2021, and the position-limiting sliding block 302 is movable between a third position and a fourth position of the position-limiting groove 2021.

Optionally, in one embodiment, an annular stepped surface 2022 is disposed on the outer side wall of the fixing member 202, the annular stepped surface 2022 is disposed towards the front housing 30, and the position-limiting groove 2021 is disposed on the annular stepped surface 2022.

In this embodiment, the outer diameter of the portion of the fixing member 202 located in the sealing member 203 is less than the outer diameter of the portion of the fixing member located out of the sealing member 203. The position-limiting groove 2021 is disposed on the annular stepped surface 2022, and the end surface of the front housing 30 opposite to the annular step can be provided with the position-limiting sliding block 302 in a protrusion manner. In this embodiment, through fitting between the position-limiting groove 2021 and the position-limiting sliding block 302, the front housing 30 can be guided to rotate relative to the fixing member 202, thereby improving the stability of rotation, avoiding damage to the sealing member 203 due to excessive compression resulting from deviation of the front housing 30 in the rotation process, and thus effectively prolonging the service life of the earphone.

Optionally, the position-limiting groove 2021 may be set in a circular arc shape, for example, an angle of circumference of the position-limiting groove 2021 is 180°.

It is to be understood that in this embodiment, the position-limiting groove 2021 and the position-limiting sliding block 302 may be used to limit the angle of rotation of the front housing 30 relative to the fixing member 202. For example, in a case that the position-limiting sliding block 302 is located at one end of the position-limiting groove 2021, it may denote rotating to the first position, and in a case that the position-limiting sliding block 302 is located at the other end of the position-limiting groove 2021, it may denote rotating to the second position. Since the angle of circumference of the position-limiting groove 2021 is set to be 180°, the position (the first position or the second position) of rotation of the front housing 30 relative to the fixing member 202 can be determined by limiting a stop position. For example, in a case that the front housing 30 is rotated relative to the fixing member 202 along a third direction to a position that does not allow further rotation, the position is the first position, and in a case that the front housing is rotated relative to the fixing member along a fourth direction to a position that does not allow further rotation, the position is the second position. The third direction is a clockwise direction or a counterclockwise direction, and the fourth direction is a clockwise direction or a counterclockwise direction, and the third direction is different from the fourth direction. Therefore, this embodiment of the present disclosure improves the convenience of the rotation operation. The front housing 30 rotating to the first position relative to the fixing member 202 is to be understood as the front housing 30 rotating to the first position relative to the rear housing 20, and the front housing 30 rotating to the second position relative to the fixing member 202 is to be understood as the front housing 30 rotating to the second position relative to the rear housing 20.

Optionally, the earphone further includes a detection member and a detection circuit, the detection member is electrically connected to the detection circuit, and the detection circuit is configured to determine a state of the earphone according to a state of the detection member.

In this embodiment, the detection member may be a Hall element and a magnet, or may be configured as a distance sensor and a position-limiting block, or may be a key, a position-limiting block and the like. For example, in the process of rotation of the front housing 30 relative to the fixing member 202, the state of the detection member is controlled to change to determine the positional state of the earphone after the rotation. The state of the earphone is to be understood as the positional state of the front housing 30 relative to the fixing member 202, or a use state of the earphone, for example determined as the left earphone or the right earphone.

Figure 2:
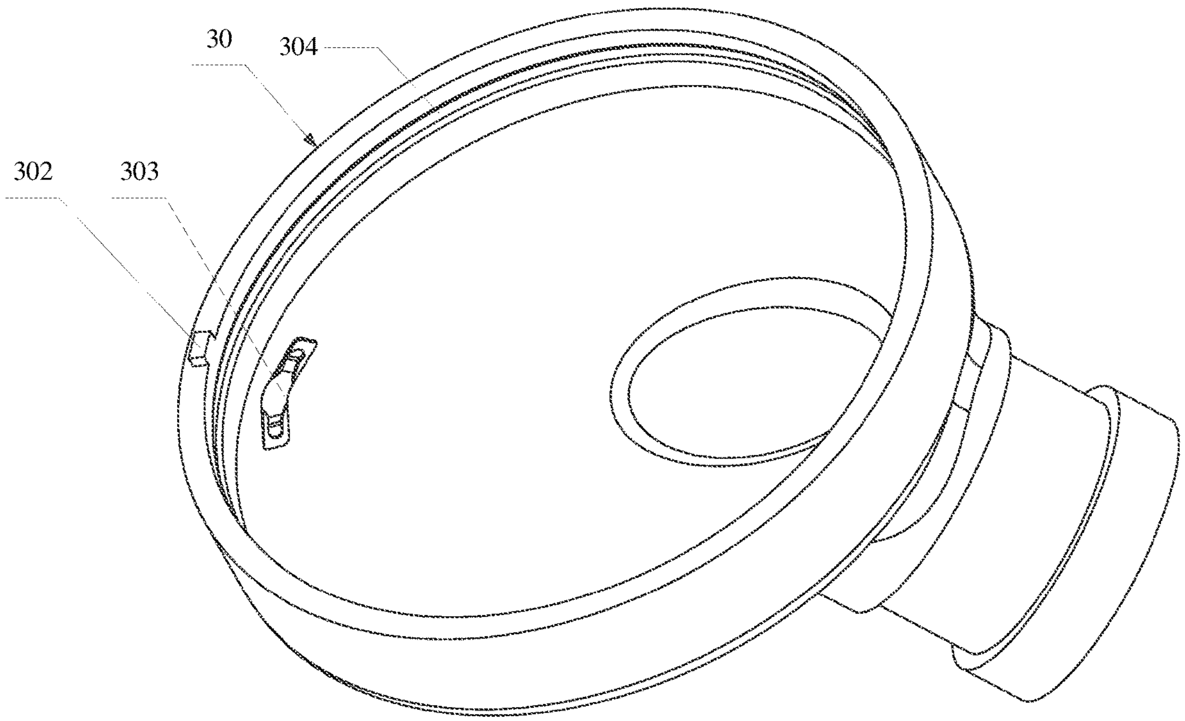
FIG. 2 is a schematic structural diagram of a front housing in the earphone provided in an embodiment of the present disclosure.
Figure 3:
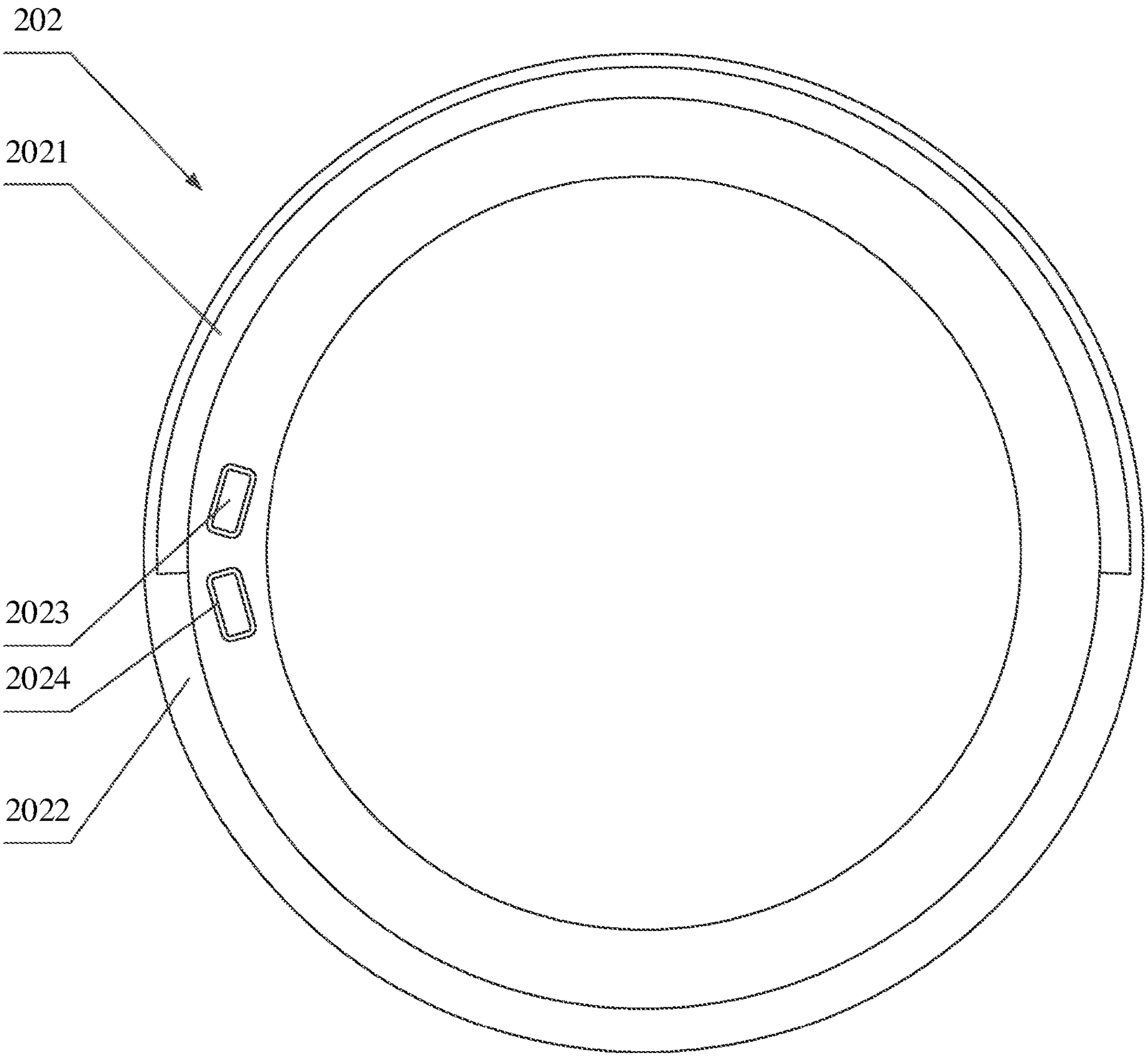
FIG. 3 is a schematic structural diagram of a fixing member in the earphone provided in an embodiment of the present disclosure.

As shown in FIG. 2 and FIG. 3, in one embodiment, the detection member includes a first metal contact 2023 and a second metal contact 2024 which are spaced on the fixing member 202, and a metal dome 303 disposed on the front housing 30, and the first metal contact 2023 and the second metal contact 2024 are electrically connected to the detection circuit; and in a case that the front housing 30 is rotated to a preset position relative to the fixing member 202, the first metal contact 2023 and the second metal contact 2024 are electrically conductively connected through the metal dome 303.

The preset position may be any position of the front housing 30 relative to the fixing member 202 between the first position and the second position. That is, it may first be set by default that the front housing 30 is at the first position, and then, according to a state of the conductive connection between the first metal contact 2023 and the second metal contact 2024 through the metal dome 303, the state of the earphone is determined, or the position (the first position or the second position) of the front housing 30 relative to the fixing member 202 is determined.

To reduce the difficulty in determining the position of rotation of the front housing 30 relative to the fixing member 202, in this embodiment, the preset position is the first position or the second position. For example, in a case that the preset position is the first position, during rotation to a certain position to use the earphone, if the first metal contact 2023 and the second metal contact 2024 are electrically conductively connected through the metal dome 303, it denotes that the current position is the first position, otherwise, it denotes that the current position is the second position.

Optionally, a communication module and a control module are further disposed in the rear housing 20, and the control module is electrically connected to the communication module and the detection circuit.

The communication module is configured to communicate with an external device, the control module is configured to output control information to the external device through the communication module according to a connection state of the first metal contact 2023 and the second metal contact 2024, the control information is used for indicating an output state of the loudspeaker 10, and the output state includes a first state in which the first channel audio signal is output or a second state in which the second channel audio signal is output.

In this embodiment, the communication module may be a Bluetooth communication module, a WiFi communication module or other near field communication modules, which is not defined here. Since it is configured that the communication module communicates with the external device, the current use state of the earphone can be transmitted to the external device, such that the audio signal output during communication can automatically match the current use state of the earphone, thereby improving the degree of intelligence of the earphone and reducing the difficulty in using the earphone. For example, the control information may include current use state information of the earphone, or may be used for denoting information on the current use state of the earphone, for example, transmitting position information, i.e., transmitting position information that the position of the front housing 30 relative to the rear housing 20 is the first position or the second position.

The descriptions above are only implementations of the present disclosure. However, the scope of protection of the present disclosure is not limited thereto. Within the technical scope recited by the present disclosure, any variation or substitution that can be easily conceived of by a person skilled in the art shall fall within the scope of protection of the present disclosure. Therefore, the scope of protection of the present disclosure shall be based on the scope of protection of the claims.

What is claimed is:

1. An earphone, comprising a loudspeaker, a rear housing and a front housing, wherein the loudspeaker is disposed in the rear housing, a sound output hole is disposed at a first end of the front housing, a second end of the front housing is rotatably connected to the rear housing, and the front housing is rotatable relative to the rear housing and between a first position and a second position;

in a case that the front housing is rotated to the first position relative to the rear housing, the sound output hole faces a first direction, and the loudspeaker is configured to output a first channel audio signal; and in a case that the front housing is rotated to the second position relative to the rear housing, the sound output hole faces a second direction, and the loudspeaker is configured to output a second channel audio signal;

wherein the first direction and the second direction are different directions; wherein the rear housing comprises a base and a fixing member, the base is connected to the fixing member, the base is provided with a first cavity, the fixing member is provided with a second cavity, the first cavity and the second cavity are communicated with each other to form an accommodating cavity, and the loudspeaker is disposed in the accommodating cavity; and the front housing is rotatably connected to the fixing member, a sound guide channel is disposed in the front housing, and the sound guide channel is communicated with the second cavity; wherein the earphone further comprises a detection member and a detection circuit, the detection member is electrically connected to the detection circuit, and the detection circuit is configured to determine a state of the earphone according to a state of the detection member; wherein the detection member comprises a first metal contact and a second metal contact which are spaced on the fixing member, and a metal dome disposed on the front housing, and the first metal contact and the second metal contact are electrically connected to the detection circuit; and in a case that the front housing is rotated to a preset position relative to the fixing member, the first metal contact and the second metal contact are electrically conductively connected through the metal dome.

2. The earphone according to claim 1, wherein a circular opening is disposed at an end of the front housing connected to the fixing member, a portion of the fixing member is located in the front housing, and an outer wall of the fixing member and an inner wall of the front housing cooperate with each other to achieve rotational connection.

3. The earphone according to claim 1, wherein the fixing member is of an annular structure.

4. The earphone according to claim 3, wherein the rear housing further comprises a sealing member, a first annular protrusion is disposed on an inner wall of the sealing member, a second annular protrusion is disposed on an outer wall of the sealing member, a first annular groove fitting the first annular protrusion is disposed on an outer side wall of the fixing member, a second annular groove fitting the second annular protrusion is disposed on the inner wall of the front housing, the sealing member is sleeved on a portion of the outer side wall of the fixing member, and the front housing is sleeved on a periphery of the sealing member;

wherein the first annular protrusion is located in the first annular groove, and the second annular protrusion is located in the second annular groove.

5. The earphone according to claim 4, wherein under an action of an external force, the front housing is rotated axially relative to the fixing member, satisfying at least one of:

the sealing member is rotatable relative to the fixing member in an axial direction; or the sealing member is rotatable relative to the front housing in the axial direction.

6. The earphone according to claim 4, wherein a quantity of annular protrusions is multiple, and a plurality of protrusions are evenly spaced on a same circumference.

7. The earphone according to claim 4, wherein a position-limiting groove is further disposed on the outer side wall of the fixing member, a position-limiting sliding block is disposed on the front housing, a portion of the position-limiting sliding block is at least located in the position-limiting groove and is in position-limiting fit to the position-limiting groove, and the position-limiting sliding block is movable between a third position and a fourth position of the position-limiting groove.

8. The earphone according to claim 7, wherein the position-limiting groove is set in a circular arc shape, and an angle of circumference of the position-limiting groove is 180°.

9. The earphone according to claim 7, wherein an annular stepped surface is disposed on the outer side wall of the fixing member, the annular stepped surface is disposed towards the front housing, and the position-limiting groove is disposed on the annular stepped surface.

10. The earphone according to claim 1, wherein the preset position is the first position or the second position.

11. The earphone according to claim 1, wherein a communication module and a control module are further disposed in the rear housing, and the control module is electrically connected to the communication module and the detection circuit;

the communication module is configured to communicate with an external device, the control module is configured to output control information to the external device through the communication module according to a connection state of the first metal contact and the second metal contact, and the control information is used for indicating an output state of the loudspeaker; and the output state comprises a first state in which the first channel audio signal is output or a second state in which the second channel audio signal is output.

* * * * *